United States Patent
Tigchelaar

(10) Patent No.: US 9,275,017 B2
(45) Date of Patent: Mar. 1, 2016

(54) METHODS, SYSTEMS, AND MEDIA FOR GUIDING USER READING ON A SCREEN

(71) Applicant: The Speed Reading Group, Chamber of Commerce No. 60482605, Amsterdam (NL)

(72) Inventor: Mark Sybren Tigchelaar, Amsterdam (NL)

(73) Assignee: The Speed Reading Group, Chamber of Commerce Number: 60482605, Amsterdam (NL)

( * ) Notice: Subject to any disclaimer, the term of this patent is extended or adjusted under 35 U.S.C. 154(b) by 0 days.

(21) Appl. No.: 14/270,780

(22) Filed: May 6, 2014

(65) Prior Publication Data

US 2014/0331125 A1    Nov. 6, 2014

Related U.S. Application Data

(60) Provisional application No. 61/820,097, filed on May 6, 2013, provisional application No. 61/821,775, filed on May 10, 2013.

(51) Int. Cl.
*G06F 17/00* (2006.01)
*G06F 17/21* (2006.01)
*G06F 17/24* (2006.01)

(52) U.S. Cl.
CPC ............ *G06F 17/211* (2013.01); *G06F 17/248* (2013.01)

(58) Field of Classification Search
CPC . G06F 17/248; G06F 17/2276; G06F 3/0485; G06F 17/211
USPC .......................................... 715/201, 273, 248
See application file for complete search history.

(56) References Cited

U.S. PATENT DOCUMENTS 4,643,450 A    2/1987    Morris
5,924,108 A    7/1999    Fein et al.
(Continued)

FOREIGN PATENT DOCUMENTS

JP    2009115859    5/2009
KR    1020110094542    8/2011
(Continued)

OTHER PUBLICATIONS

Office Action dated Jan. 7, 2015 in U.S. Appl. No. 14/493,773.
(Continued)

*Primary Examiner* — Stephen Hong
*Assistant Examiner* — Marshon Robinson
(74) *Attorney, Agent, or Firm* — Byrne Poh LLP

(57) ABSTRACT

In some embodiments, a method for guiding user reading on a screen is provided, the method comprising: determining a reading speed of a user; receiving a selection of a document having an original layout to be read; setting a reading speed for the document; formatting the selected document for presentation to the user on a screen; presenting the formatted document using the original document layout; dividing text in the formatted document into blocks that include a plurality of words; reformatting the blocks based on the layout of the formatted document and punctuation of the document to include at least one word, such that each reformatted block includes less than a predetermined number of characters and the at least one word of the reformatted block is on a single line in the text of the document; and presenting guidance to the user within the formatted document at the set reading speed.

20 Claims, 12 Drawing Sheets

(56) References Cited

U.S. PATENT DOCUMENTS

| | | | |
|---|---|---|---|
| 6,098,085 A | 8/2000 | Blonder et al. | |
| 6,113,394 A * | 9/2000 | Edgar | 434/179 |
| 6,568,939 B1 * | 5/2003 | Edgar | 434/179 |
| 7,555,713 B2 * | 6/2009 | Yang | 715/248 |
| 7,970,616 B2 * | 6/2011 | Dapkunas | 704/270 |
| 8,271,865 B1 * | 9/2012 | Bennett | 715/201 |
| 8,538,989 B1 | 9/2013 | Datar et al. | |
| 8,676,795 B1 | 3/2014 | Durgin et al. | |
| 2002/0124026 A1 * | 9/2002 | Weber | 707/526 |
| 2003/0025724 A1 * | 2/2003 | Ullmann et al. | 345/707 |
| 2004/0025111 A1 | 2/2004 | Park | |
| 2004/0080541 A1 * | 4/2004 | Saiga et al. | 345/805 |
| 2004/0181755 A1 | 9/2004 | Murata et al. | |
| 2004/0253568 A1 | 12/2004 | Shaver-Troup | |
| 2006/0190804 A1 * | 8/2006 | Yang | 715/500 |
| 2006/0277464 A1 | 12/2006 | Knight et al. | |
| 2007/0015123 A1 | 1/2007 | Morris | |
| 2007/0061717 A1 | 3/2007 | Cragun et al. | |
| 2007/0234209 A1 | 10/2007 | Williams | |
| 2008/0016091 A1 | 1/2008 | Chandra | |
| 2008/0046845 A1 | 2/2008 | Chandra | |
| 2008/0086680 A1 | 4/2008 | Beckman | |
| 2008/0141126 A1 * | 6/2008 | Johnson et al. | 715/273 |
| 2008/0162275 A1 | 7/2008 | Logan et al. | |
| 2008/0282153 A1 | 11/2008 | Kindeberg et al. | |
| 2008/0288859 A1 | 11/2008 | Yuan et al. | |
| 2009/0042172 A1 | 2/2009 | Morris | |
| 2009/0132384 A1 | 5/2009 | Duncan et al. | |
| 2010/0030859 A1 | 2/2010 | Huang | |
| 2010/0153889 A1 * | 6/2010 | Krause | 715/856 |
| 2010/0257480 A1 | 10/2010 | Kurose | |
| 2011/0153464 A1 | 6/2011 | Hendricks et al. | |
| 2011/0189639 A1 | 8/2011 | Morris | |
| 2011/0289105 A1 | 11/2011 | Hershowitz | |
| 2012/0054672 A1 * | 3/2012 | McDowell | 715/784 |
| 2012/0210203 A1 * | 8/2012 | Kandekar et al. | 715/230 |
| 2012/0226976 A1 | 9/2012 | Wolter | |
| 2012/0320416 A1 | 12/2012 | Mbenkum et al. | |
| 2013/0120548 A1 | 5/2013 | Li et al. | |
| 2013/0152014 A1 | 6/2013 | Rabii et al. | |
| 2013/0227404 A1 | 8/2013 | Silich | |

FOREIGN PATENT DOCUMENTS

| | | |
|---|---|---|
| KR | 1020130039861 | 4/2013 |
| KR | 1020130035141 | 8/2013 |

OTHER PUBLICATIONS

Office Action dated Jun. 19, 2015 in U.S. Appl. No. 14/493,773.
Office Action dated Jan. 28, 2015 in U.S. Appl. No. 14/493,705.
Office Action dated Jul. 6, 2015 in U.S. Appl. No. 14/493,705.
Nielsen, K., "How Speed-Reading Software Trains Your Brain", in TopTenReviews, Sep. 5, 2012, pp. 1-6, available at: http://speed-reading-software-review.toptenreviews.com/how-speed-reading-software-trains-your-brain.html.

* cited by examiner

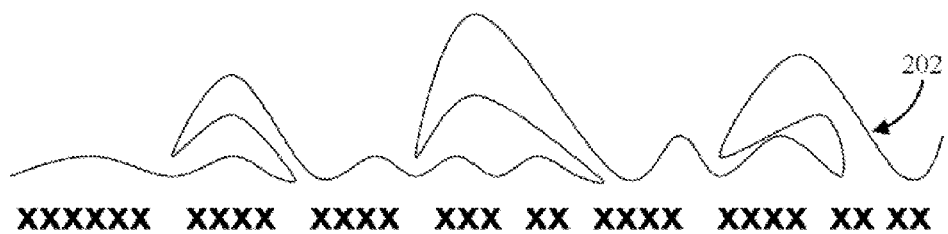
FIG. 2A: Unguided Reader Eye Movement
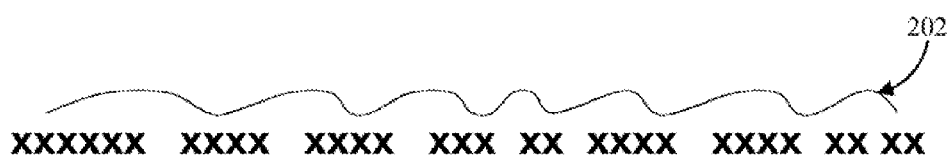
FIG. 2B: Eye Movement of Beginning Speed Reader
FIG. 2C: Less Inefficient Word Groupings
FIG. 2D: More Efficient Word Groupings
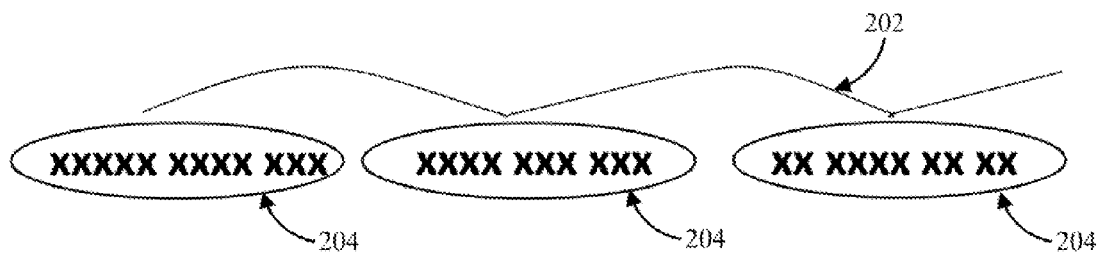
FIG. 2E: Guided User Eye Movement 302 → Lorem ipsum dolor sit amet, lacus elit sodales quam dui mi, a aliquot ac lorem vivamus lobortis, nunc ac sed, wisi fringilla a sed nulla nibh donec. Dolor justo aliquam potenti dignissim amet ut, tincidunt maecenas pharetra dolor ipsum eu, ut dolor ullamcorper. Sed ullamcorper pede, facilisi quam. Diam at ac leo vulputate pellentesque, vestibulum vestibulum lorem, a wisi feugiat, maecenas tempor imperdiet parturient ut ligula. Fringilla duis, in massa mattis et lorem. Orci semper vulputate varius nibh, etiam dolor sodales tincidunt leo etiam, phasellus vivamus donec, ullamcorper mus, dolores id mauris.

FIG. 3A

304 → Lorem ipsum dolor sit amet, lacus elit sodales quam dui mi, a aliquot ac lorem vivamus lobortis, nunc ac sed, wisi fringilla a sed nulla nibh donec. Dolor justo aliquam potenti dignissim amet ut, tincidunt maecenas pharetra dolor ipsum eu, ut dolor ullamcorper. Sed ullamcorper pede, facilisi quam. Diam at ac leo vulputate pellentesque, vestibulum vestibulum lorem, a wisi feugiat, maecenas tempor imperdiet parturient ut ligula. Fringilla duis, in massa mattis et lorem. Orci semper vulputate varius nibh, etiam dolor sodales tincidunt leo etiam, phasellus vivamus donec, ullamcorper mus, dolores id mauris.

FIG. 3B

306 → Lorem ipsum dolor sit amet, lacus elit sodales quam dui mi, a [aliquot ac lorem] vivamus lobortis, nunc ac sed, wisi fringilla a sed nulla nibh donec. Dolor justo aliquam potenti dignissim amet ut, tincidunt maecenas pharetra dolor ipsum eu, ut dolor ullamcorper. Sed ullamcorper pede, facilisi quam. Diam at ac leo vulputate pellentesque, vestibulum vestibulum lorem, a wisi feugiat, maecenas tempor imperdiet parturient ut ligula. Fringilla duis, in massa mattis et lorem. Orci semper vulputate varius nibh, etiam dolor sodales tincidunt leo etiam, phasellus vivamus donec, ullamcorper mus, dolores id mauris.

FIG. 3C

308 → Lorem ipsum dolor sit amet, lacus elit sodales quam dui mi, a [aliquot ac lorem] vivamus lobortis, nunc ac sed, wisi fringilla a sed nulla nibh donec. Dolor justo aliquam potenti dignissim amet ut, tincidunt maecenas pharetra dolor ipsum eu, ut dolor ullamcorper. Sed ullamcorper pede, facilisi quam. Diam at ac leo vulputate pellentesque, vestibulum vestibulum lorem, a wisi feugiat, maecenas tempor imperdiet parturient ut ligula. Fringilla duis, in massa mattis et lorem. Orci semper vulputate varius nibh, etiam dolor sodales tincidunt leo etiam, phasellus vivamus donec, ullamcorper mus, dolores id mauris.

FIG. 3D

Lorem ipsum dolor sit amet, lacus elit sodales quam dui mi, a aliquot ac lorem vivamus lobortis, nunc ac sed, wisi fringilla a sed nulla nibh donec. Ⓞ Dolor justo aliquam potenti dignissim amet ut, tincidunt maecenas pharetra dolor ipsum eu, ut dolor ullamcorper. Sed ullamcorper pede, facilisi quam. Diam at ac leo vulputate pellentesque, vestibulum vestibulum Ⓒ lorem, a wisi feugiat, maecenas tempor imperdiet parturient ut ligula. ―310
Fringilla duis, in massa mattis et lorem. Orci semper vulputate varius nibh, etiam dolor sodales tincidunt leo etiam, phasellus vivamus donec, ① ullamcorper mus, dolores id mauris.

FIG. 3F

| 1975<br>←―312<br>The Netherlands<br>←―312 | Since 1975, most Heineken brand beer has been brewed at the Heineken brewery in Zouterwoude, the Netherlands. In 2011, 2.74 billion litres of Heineken brand beer was produced worldwide, while the total beer production of all breweries fully owned by the Heineken Group over all brands was 16.46 billion litres globally. |
|---|---|

FIG. 3G

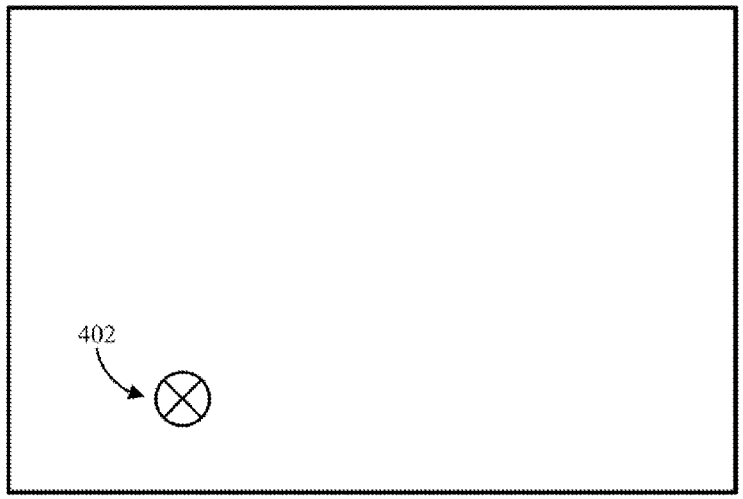

FIG. 4A

Lorem ipsum dolor sit amet, lacus elit sodales quam dui mi, a aliquot ac lorem vivamus lobortis, nunc ac sed, wisi fringilla a sed nulla nibh donec. Dolor justo aliquam potenti dignissim amet ut, tincidunt maecenas pharetra dolor ipsum eu, ut dolor ullamcorper. Sed ullamcorper pede, facilisi quam. Diam at ac leo vulputate pellentesque, vestibulum vestibulum lorem, a wisi feugiat, maecenas tempor imperdiet parturient ut ligula. Fringilla duis, in massa mattis et lorem. Orci semper vulputate varius nibh, etiam dolor sodales tincidunt leo etiam, phasellus vivamus donec, ullamcorper mus, dolores id mauris.

FIG. 4B

METHODS, SYSTEMS, AND MEDIA FOR GUIDING USER READING ON A SCREEN

CROSS-REFERENCE TO RELATED APPLICATIONS

The application claims the benefit of U.S. Provisional Patent Application No. 61/820,097, filed May 6, 2013, and U.S. Provisional Patent Application No. 61/821,775, filed May 10, 2013, which are hereby incorporated by reference herein in their entireties.

TECHNICAL FIELD

The disclosed subject matter relates to methods, systems, and media for guiding user reading on a screen.

BACKGROUND

Many online and offline reading applications allow users to read documents (e.g., articles, works of fiction, textbooks, newspapers, magazines, etc.) on a screen. However, studies have shown that, during a normal reading process of an untrained reader, the movement of the eyes of the reader is not a smooth straight line across a line of text from left to right. Rather than that, readers typically go back to read (consciously read-back) and jump back to read (subconsciously read-back) by re-reading a portion of text already read, and this re-reading can consume 30% of total reading time.

Accordingly, it is desirable to provide new mechanisms for guiding user reading on a screen.

SUMMARY

Methods, systems, and media for guiding user reading on a screen are provided. In accordance with some embodiments of the disclosed subject of matter, methods for guiding user reading on a screen are provided, the methods comprising: determining a reading speed of a user using a hardware processor; receiving a selection of a document having an original layout to be read; setting a reading speed for the document; formatting the selected document for presentation to the user on a screen; presenting the formatted document using the original document layout; dividing text in the formatted document into blocks that include a plurality of words; reformatting the blocks based on the layout of the formatted document and punctuation of the document to include at least one word, such that each reformatted block includes less than a predetermined number of characters and the at least one word of the reformatted block is on a single line in the text of the document; and presenting guidance to the user within the formatted document at the set reading speed.

In accordance with some embodiments of the disclosed subject of matter, systems for guiding user reading on a screen are provided, the systems comprising: a hardware processor that is programmed to: determine a reading speed of a user; receive a selection of a document having an original layout to be read; set a reading speed for the document; format the selected document for presentation to the user on a screen; present the formatted document using the original document layout; divide text in the formatted document into blocks that include a plurality of words; reformat the blocks based on the layout of the formatted document and punctuation of the document to include at least one word, such that each reformatted block includes less than a predetermined number of characters and the at least one word of the reformatted block is on a single line in the text of the document; and present guidance to the user within the formatted document at the set reading speed.

In accordance with some embodiments of the disclosed subject of matter, non-transitory computer-readable media containing computer-executable instructions that, when executed by a processor, cause the processor to perform a method for guiding user reading on a screen are provided, the method comprising: determining a reading speed of a user; receiving a selection of a document having an original layout to be read; setting a reading speed for the document; formatting the selected document for presentation to the user on a screen; presenting the formatted document using the original document layout; dividing text in the formatted document into blocks that include a plurality of words; reformatting the blocks based on the layout of the formatted document and punctuation of the document to include at least one word, such that each reformatted block includes less than a predetermined number of characters and the at least one word of the reformatted block is on a single line in the text of the document; and presenting guidance to the user within the formatted document at the set reading speed.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIGS. 2A-2E show examples of lines that represent eye movements exhibited by a user in accordance with some embodiments of the disclosed subject matter.

FIGS. 3A-3I show examples of techniques for including guidance information within a formatted document in accordance with some embodiments of the disclosed subject matter.

FIGS. 4A-4D show examples of a user interface for conducting eye movement exercises in accordance with some embodiments of the disclosed subject matter.

DETAILED DESCRIPTION

In accordance with various embodiments, as described in more detail below, mechanisms, which can include methods, systems, and computer-readable media, for guiding user reading on a screen are provided.

In some embodiments, these methods, systems, and media can present guidance information to a user within a document being presented to the user. Such guidance information can, in some embodiments, include successively highlighting groups of one or more words (or other information, such as equations, etc.) within the document to encourage the user to read the text of the document by moving the path of the user's eyes from one portion highlighted by guidance information to the next.

In some embodiments, multiple words can be highlighted by such guidance information, and the methods, systems, and media for guiding user reading on the screen described herein can encourage the user to read multiple words each time the user's eyes move from one highlighted group of words to the next within the document. This can allow the user to read the contents of the document more quickly, and/or with increased reading comprehension than if the user were read the document without the guidance information being presented using the methods, systems, and media described herein.

Figure 1A:
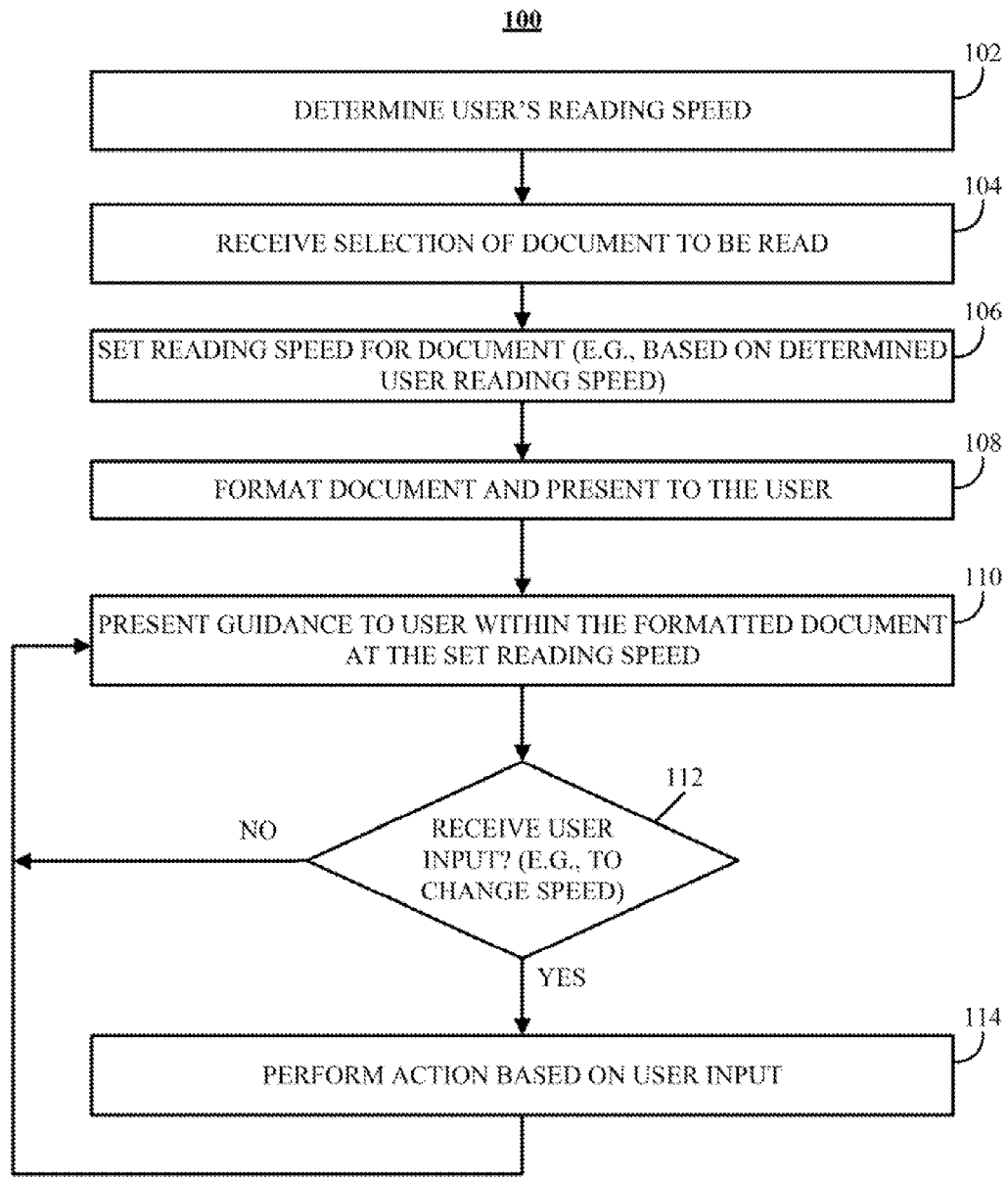
FIG. 1A shows a flow chart of an example of a process for guiding user reading on a screen in accordance with some embodiments of the disclosed subject matter.

Turning to FIG. 1A, a process 100 for guiding user reading on a screen is shown in accordance with some embodiments of the disclosed subject matter. Process 100 can begin by determining a user's reading speed using any suitable technique(s) at 102. For example, in some embodiments, process 100 can cause a sample of text to be displayed to the user for the user to read. In such an embodiment, process 100 can receive an indication that the user is done reading the text, and process 100 can determine the user's reading speed based on the amount of time that it took for the user to read the sample text. As another example, in some embodiments, if the sample of text contains multiple pages and/or is being displayed as scrollable text, process 100 can determine a user's reading speed based on page-turning behavior and/or scrolling behavior of the user. As still another example, process 100 can query the user to provide the user's estimated reading speed. As yet another example, process 100 can receive a previously determined reading speed of the user, for example, from memory of a device executing process 100.

In some embodiments, prior to testing the user's reading speed (e.g., by presenting a sample text for the user to read), process 100 can present the user with information regarding the operation of an application for guiding user reading on a screen that incorporates process 100.

In some embodiments, process 100 can determine the user's reading speed at 102 as words per minute (WPM) read. Such a determined reading speed can be set as a default reading speed when a document is selected to be read (e.g., as described below in connection with 104).

In some embodiments, testing the user's reading speed can include requesting that the user read a sample text and perform an action when done reading the sample text (e.g., by selecting a particular user interface item such as a "stop" button, a "done" button, etc., using any suitable user interface such as a pointing device, a touchscreen, etc.). In some embodiments, movement of the user's eyes with respect to the sample text can be tracked during the test, and the determination of the user's reading speed can be based at least partially on the user's eye movements.

In some embodiments, process 100 can present information related to how a reader's eyes typically move while reading text (e.g., as shown in FIG. 2A described below), which can be presented using text, audio, images, video, or any other suitable technique(s) for conveying such information to the user. Additionally or alternatively, process 100 can present information related to the technique(s) used by process 100 to provide guidance to the user during reading in accordance with the mechanisms described here. Such information can be presented at any suitable time, such as after testing the user's reading speed, prior to testing the user's reading speed, in response to selection of a "help" or "more information" user interface item by the user, etc.

In some embodiments, process 100 can present exercises to the user to train the user's eye muscles, which may allow the user to read more efficiently and/or more quickly. For example, exercises described below in connection with FIGS. 4A-4D can be presented to the user: after testing the user's reading speed; as part of an introduction to an application that utilizes process 100; prior to testing the user's reading speed; in response to a selection of a user interface element corresponding to such exercises; in response to any other command to start such exercises (e.g., a voice command); etc.

In some embodiments, process 100 can present the user with various technique(s) used for guiding reading by the user, such that the user can experiment with various techniques and choose a technique preferred by the user. For example, one or more of the techniques described below in connection with FIGS. 3A-3I can be presented to the user, such that the user can choose a particular technique to use.

In some embodiments, process 100 can request that the user perform a second test by reading a sample text (which may be the same text or a different text from the sample text described above) using the mechanisms described herein. The second test can otherwise be similar to the test performed to measure the user's reading speed without using the mechanisms described herein. In such a test, process 100 can use a particular guidance technique chosen by a user to guide the user's reading. Additionally or alternatively, process 100 can request that the user read a sample text using each of the one or more available techniques for guiding reading by the user (or some subset of such techniques).

In some embodiments, if a second test is performed, process 100 can present the user with information related to a performance improvement by the user from the first test (e.g., the test performed without guidance using the mechanisms described herein) to the second test using one or more of the guidance techniques described herein (or results for multiple different techniques). In some embodiments, information on the user's performance improvement can be presented using any suitable technique(s), such as text (e.g., an explanation that the user's reading speed changed from "X" WPM to "Y" WPM), graphically, etc.

FIG. 2A shows an example of a line that represents eye movements 202 exhibited by a typical untrained reader (e.g., a person reading at their natural pace that has not used speed reading exercises to adjust her reading style, a person that is not being guided using the mechanisms described herein, etc.). As shown in FIG. 2A, during reading, many readers eyes make backward movements over the text during reading. This is typically an unintentional movement of the eye that is not noticed by the reader, but which can negatively affect the speed at which the reader can read a text.

FIG. 2B shows an example of a line that represents eye movements 202 exhibited by a beginning speed reader (e.g., a person that has performed exercises to become a faster reader, such as speed reading exercises). As shown, the reader's eye movements in FIG. 2B progress through the text with less movement of the eyes.

In some embodiments, as described below in connection with 110 of FIG. 1A, during guided reading using the mechanisms described herein, groups of words can be highlighted to aid the user in reading a text. As described below, such groupings can be based on the amount of characters that can be comprehended during a single eye fixation of the user (or of a typical reader). For example, as shown in FIGS. 2A and 2B, the reader focuses on a single word per fixation. However, a typical reader can comprehend 18 characters per fixation (which can include punctuation, formatting such as spaces, etc.), although the number of characters that can be comprehended per fixation varies from person to person.

FIGS. 2C and 2D show groupings 204 and 206 of words that can be comprehended by a typical reader during a single eye fixation. The groupings in FIG. 2C are less efficient than the groupings in FIG. 2D because grouping 206 in FIG. 2C contains only five characters (or six including the space prior to the word, for example), which is far below the amount of characters comprehensible to a typical reader during a single eye fixation (e.g., 18 characters).

In some embodiments, process 100 can adjust a total number of characters per line based on a number of characters that can be comprehended by a given reader during a single eye fixation. For example, the total number of characters per line can be a multiple number of the number of characters that can be comprehended by a given reader during a single eye fixation (e.g., 72, 90, 108, etc. if the number of characters that can be comprehended by a given reader during a single eye fixation is 18 characters). As another example, if the last grouping of words in a line contains a smaller number of characters than the number of characters that can be comprehended by a given reader during a single eye fixation, such as grouping 206 in FIG. 2C, the words in that grouping can be presented on the next line, and to be grouped with other words as a new grouping 204 that contains the number of characters that can be comprehended by a given reader during a single eye fixation (e.g., 18 characters).

FIG. 2E shows an example of a line that represents eye movements 202 of a user during guided reading using the mechanisms described herein. As illustrated in FIGS. 2A, 2B, and 2E, a user performing guided reading using the mechanisms described herein may perform less eye fixations than a typical reader (e.g., shown in FIG. 2A) or a beginning speed reader (e.g., shown in FIG. 2B), when reading a similar length of text.

Referring back to FIG. 1A, at 104, process 100 can receive a selection of a document to be read using the mechanisms described herein. A selection of a document to be read can be received using any suitable technique(s). For example, process 100 can receive a selection of a document to be read from a library of documents available to be read. As another example, process 100 can be executed as part of an application for reading documents (e.g., a document reading application, a Web Browser application, etc.) and can be used whenever a document is being read using the application. As yet another example, process 100 can be executed as part of an application for reading documents on a computing device (e.g., a personal computer, a laptop computer, a smartphone, a tablet computer, a wearable computer, etc.), and a selection of a document to be read can be received using an interface of the computing device. As a more particular example, process 100 can be executed as a plug-in, add-on, extension, or other additional software that can act in concert with other software, such MICROSOFT WORD, ADOBE READER, ADOBE ACROBAT, MOZILLA FIREFOX Web browser, GOOGLE CHROME Web Browser, or any other document editing and/or reading software. As still another example, process 100 can receive the selection of a document to be read based on a document that was being read when an application executing process 100 was closed, paused, when focus was switched to another application, etc.

In some embodiments, a document to be read can be in any suitable format and can include text, formatting information (e.g., different fonts, line spacing, bolding, italics, margins, etc.), images, video, and any other suitable information. Examples of document formats that can be used by process 100 can include: Portable Document Format (PDF) format; a plain text format such as ASCII, UTF-8, etc.; Amiga Guide format; Microsoft Word format (e.g., using file extension ".doc"); DjVu format; Office Open XML format (e.g., using file extension ".docx"); Open Document format (e.g., using file extension ".odt"); Open XML Paper Specification (OXPS) format; DocBook format (e.g., an XML format typically used for technical documentation); HTML (e.g., using extension ".html" or ".htm"); FictionBook format (e.g., using file extension ".fb2"); Pages Postscript format (e.g., using file extension ".ps"); Rich Text Format (RTF); TeX format; TEI format; Troff format; Uniform Office Format (e.g., a standard Chinese format); WordPerfect format (e.g., using file extension ".wpd," ".wp," ".wp7," etc.); electronic publication (EPUB) format; AZW format; KF8 format; or any other suitable format or combination of formats.

In some embodiments, a document to be read can be selected from a library of documents associated with the user. Such a library of documents can contain documents that are imported from or opened from another application, purchased through an application executing process 100, etc. As described below, such a library can be organized and/or searched using any suitable technique.

In some embodiments, any suitable document can be imported into an application executing process 100 and can be automatically added to the library upon importing such a document. In such embodiments, documents can be imported form any suitable source, such as: DROPBOX; GOOGLE DRIVE; BOX; SKYDRIVE; SUGARSYNC; WEBDAV-SERVER; SFTP; OFFICE 365 SHAREPOINT; MYDISK.SE; FILESANYWHERE; STOREGATE; CLOUDME; a Web page or Web site; READ IT LATER; EVERNOTE; SHELFARI; INSTAPAPER; REEDER; an RSS feed; an email server (e.g., the application can be assigned an email address to which documents to be added to the library can be sent); etc.

At 106, process 100 can set a reading speed for the document selected at 104. Any suitable technique(s) can be used to set the reading speed for the document. For example, the reading speed can be set based on the user's reading speed determined at 102 (e.g., based on an unguided test or based on a guided test using the mechanisms described herein). As another example, the reading speed can be based on the formatting of document. As yet another example, if the user has previously read at least a portion of the document, the reading speed can be set based on a reading speed at which the user was previously reading the document.

Figure 1B:
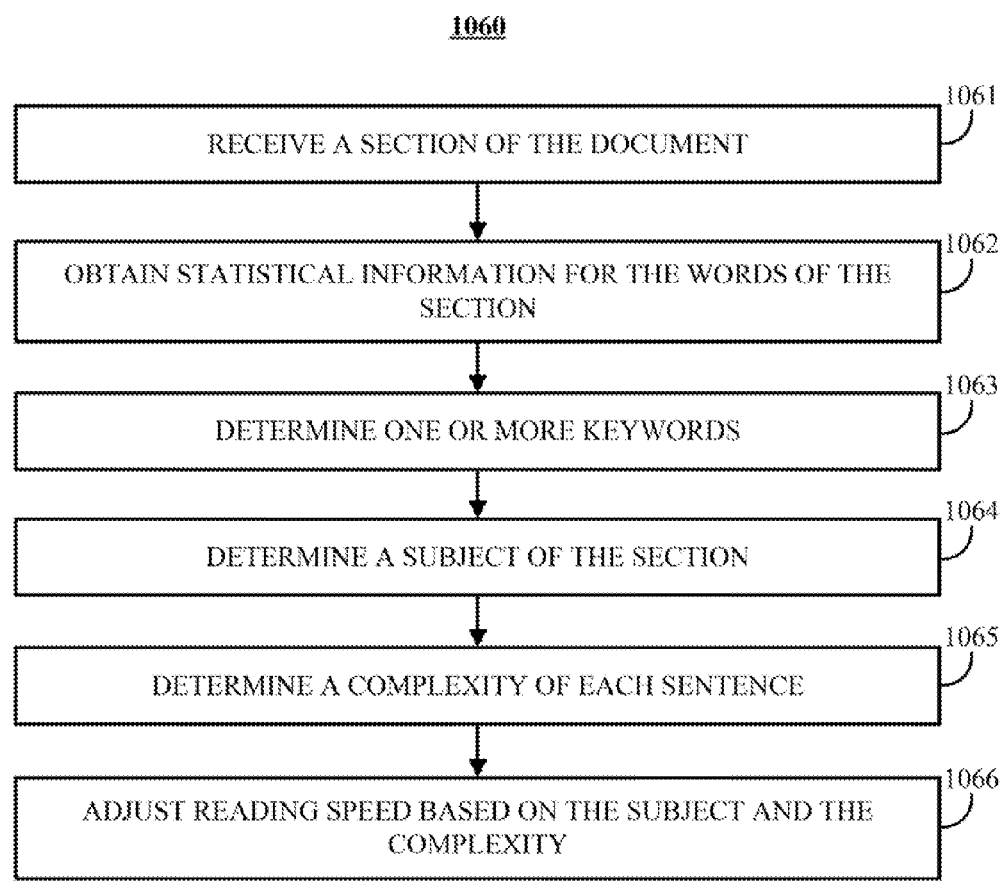
FIG. 1B shows a flow chart of an example of a process for adjusting reading speed based on an analysis of a section of a document in accordance with some embodiments of the disclosed subject matter.

In some embodiments, process 100 can adjust the reading speed based on one or more suitable factors. For example, as illustrated in FIG. 1B, an example of process 1060 can be used at 106 of FIG. 1A to adjust the reading speed based on an analysis of a section of the document selected at 104.

In some embodiments, process 1060 can begin by receiving a section of the document at 1601. For example, a section of text containing one or more sentences can be received before being presented to the user. Next, process 1060 can obtain statistical information for the words of the section at 1062. For example, process 1060 can count how many times each word appears in the section of text. As another example, process 1060 can count how many times a word and its related words appear in the section of text. In such an example, a relationship between two words can include synonym words, hypernym-hyponym words, words that describe another word, and/or any other suitable relationship between two words.

In some embodiments, at 1063, process 1060 can determine one or more keywords of the section of text based on the words' statistical information. For example, process 1060 can determine one or more keywords by calculating a keyword density. In a more particular example, a density of a word can be calculated by dividing the number of times the word is present in the section by the total number of words in the section. As another more particular example, a density of a word can be calculated by dividing the number of times the word and its related words are present in the section by the total number of words in the section.

In some embodiments, process 1060 can determine a subject of the section based on one or more keywords of the section at 1064. For example, process 1060 can determine a subject of the section based on how many times a word related to a keyword appears in the section of text. In such an example, a word related to a keyword can be a synonym word of a keyword, a hypernym word of a keyword, a hyponym word of a keyword, one of the words that describe a keyword, etc. As a particular example, if the keyword of a section of text is "cookie," and the number of times the word "kitchen" or the word "sugar" is present in the section is more than the number of times the word "Internet" or the word "browser" is present in the section, process 1060 can determine that there is a high probability that the subject of the section is "cooking" rather than "computer."

In some embodiments, process 1060 can determine a complexity of each sentence in the section at 1065. In some embodiments, a complexity of a sentence can be determined based on any suitable factor. For example, a complexity of a sentence can be determined based on the length of the sentence. In such an example, a short sentence that contains few words can be determined to be a sentence with low complexity, while a long sentence that contains many words can be determined to be a sentence with high complexity. As a more particular example, a complexity of a sentence can be determined by using the Flesch/Flesch-Kincard formula.

As another example, a complexity of a sentence can be determined based on the grammatical structure of the sentence. In such an example, a sentence that has a simple grammatical structure can be determined to be a sentence with low complexity, while a sentence that has a complex grammatical structure can be determined to be a sentence with high complexity. As yet another example, a complexity of a sentence can be determined based on the difficulties of words in the sentence. In such an example, a sentence consisting of common words can be determined to be a sentence with low complexity, while a sentence that contains one or more uncommon words can be determined to be a sentence with high complexity. In some embodiments, one or more factors can be numerically scored and/or weighted using any suitable scale, and the resulting weighted scores can be combined in any suitable way to determine the complexity of a sentence.

In some embodiments, at 1066, process 1060 can adjust a reading speed based on the subject of the section and the complexity of each sentence in the section. For example, process 1060 can increase the reading speed for a sentence with low complexity (e.g., a short sentence, a sentence that has a simple grammatical structure, a sentence that consists of common words, etc.), and can decrease the reading speed for a sentence with high complexity (e.g., a long sentence, a sentence that has a complex grammatical structure, a sentence that contains uncommon words, etc.). As another example, process 1060 can compare the subject of the section with subjects of sections that have been read before by the user. In response to determining that the subject of the section is a new type that the user has not read before, process 1060 can decrease the reading speed.

Referring back to FIG. 1A, at 108, process 100 can format the document selected at 104 for presentation to the user, and cause the formatted document to be presented to the user for reading. The document can be formatted using any suitable technique(s). For example, process 100 can format the document based on a size and/or resolution of a display on which the document is to be read (e.g., the document can be formatted such that a user does not have to scroll to read a single line of text, for example by changing a size of the document, changing a font-size of the document, changing line breaks in the document, etc.). As another example, process 100 can format the document using particular formatting rules to increase the benefits of the mechanisms described herein (e.g., by ensuring that each line is grouped efficiently to the extent possible, to ensure that groups of words are all on the same line, by changing a font size and font to a style that increases the amount of information that a reader can comprehend per eye fixation, etc.). The layout of a text can impact reading speed, reading comprehension, concentration and reading comfort of a reader. Many documents are not formatted with these considerations in mind, but are formatted to fit in a particular space, look pleasant, etc. Reformatting such documents can have a positive effect on reading speed, reading comprehension, concentration and reading comfort of a reader in some cases.

In some embodiments, a document to be read can be formatted using predetermined formatting rules that promote faster reading speed, increased reading comprehension, increased concentration, and/or increased reading comfort of user. In such embodiments, whether to perform this formatting or to primarily keep the original formatting of the document can be based on receiving a selection of an option from the user. Such formatting is sometimes referred to herein as "optimized formatting," however this should not be read as an indication that such formatting is being claimed to be the most optimal formatting for maximizing such factors related to reading. When such optimized formatting is selected, the document can be formatted and presented to the user using the formatting rules that correspond to optimized formatting. This can include setting a font of the document to a particular font (e.g., to Arial, or the like), setting the size of the font to a particular size (e.g., 12 point font), setting the line spacing to a particular line spacing (e.g., 1.5 spacing), setting a text color to a particular text color (e.g., black), setting the background color of the document to a particular background color (e.g., light grey), adding extra space after each paragraph, breaking the text into two columns, and/or any other suitable formatting. In some embodiments, this can be performed on any suitable electronic document, such as a Web page, a document file (e.g., PDF, .txt, .doc, etc.), a scanned file (e.g., using optical character recognition (OCR)), etc. In some embodiments, other aspects of the document can be left unchanged, such as links in the text, images in the document, footnotes, end notes, quotations, headers, punctuation, the number of paragraphs, page numbers, etc.

In some embodiments, formatting the document at 108 can include formatting the document based on software and/or hardware of a device executing process 100 such that the document can be displayed to a user. For example, the document can be formatted such that it is caused to be displayed by the device executing process 100 so that it is presented in the same way as the document would be displayed on another device having a different hardware and/or software configuration. In a more particular example, if the document is a PDF document, it can be formatted such that the document is caused to be displayed with all original characteristics of the document, including layout, paragraphs, graphics placements, images and image placements, fonts, font size, page breaks, etc.

In some embodiments, an original layout of a document can be left relatively unchanged when formatting the document, for example, by showing images or graphics within the document, by not changing paragraph breaks, etc. In some embodiments, this can allow guidance information (e.g., as provided in 110 described below) to be provided in a document that has a similar layout and/or similar graphics placements, paragraphs, etc., to the document before formatting is performed at 108.

Figure 3E:
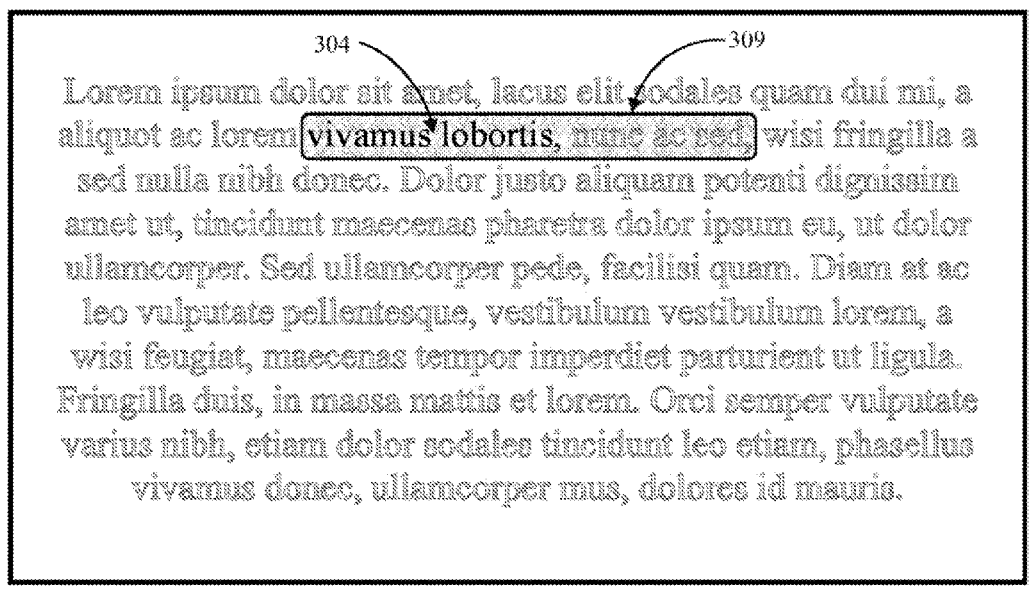

At 110, process 100 can present guidance information to the user within the formatted document at the reading speed set at 106. Any suitable technique(s) can be used to present guidance to the user. FIGS. 3A-3I show examples of techniques for including guidance information within the formatted document. For example, FIG. 3A shows guidance information in a formatted document as an underline 302 that highlights a group of words to be read by the user (e.g., as a group of words 204).

As another example, FIG. 3B shows guidance information in a formatted document as a group of words 304 to be read by the user that is shown in black to highlight the group of words to be read by the user, while the other words in the document are de-emphasized by being presented in light grey. Note that the other words can be presented using any suitable technique(s) that make them less prominent to the user, such as by making the words blurry, making the words appear transparent, and/or any other suitable technique(s).

As yet another example, FIG. 3C shows guidance information in a formatted document where the words to be read by the user are highlighted in a bright color 306 such as the yellow of a marker used for highlighting printed text. As still another example, guidance information can be provided in the form of a ball or dot that highlights the words to be read by the user, which can move along in the text using any suitable technique (e.g., under the text to be read, etc.), which can be similar to the training technique described in connection with the example of FIG. 4B, described below.

As still another example, FIG. 3D shows guidance information in a formatted document where a grouping of words containing the amount of characters during a single eye fixation (e.g., 18 characters) to be read by the user are highlighted in a grey bar 308 that can move to the next grouping of words at the predetermined reading speed, which can guide the eyes of the user. Note that, when the line of words being read is presented, the other lines of words can be presented using any suitable technique(s) that make them less prominent to the user, such as by making the words blurry, making the words appear transparent, and/or any other suitable technique(s).

As a further example, FIG. 3E shows guidance information in a formatted document where the words to be read by the user are shown in a grey bar 309 that can move from the left to the right of a line at the predetermined reading speed. In grey bar 309, a grouping of words 304 containing the amount of characters that can be comprehended by a user during a single eye fixation (e.g., 18 characters) are highlighted. The highlighting can move from one grouping of words to a next grouping of words at the predetermined reading speed for guiding the eyes of the user. Note that, when words being read are presented in the grey bar 309, all other words located outside of grey bar 309 can be presented using any suitable technique(s) that make them less prominent to the user, such as by making the words blurry, making the words appear transparent, and/or any other suitable technique(s).

Additionally, any other suitable technique(s) for highlighting a group of words to be read can be used with the mechanisms described herein, such as placing a box around the words to be read, circling the text to be read, etc.

In some embodiments, process 100 can choose a group of words to be highlighted in accordance with the mechanisms described herein by taking into account predetermined criteria. For example, in some embodiments, the text within a document can be grouped into blocks of text. Such blocks can be blocks of any suitable size that can be comprehended by a reader during a single eye fixation. In a more particular example, the block size can be set to a default block size such as 12 characters, 13 characters, 14 characters, etc., which can include letters, numbers, punctuation, spaces, special characters (e.g., currency symbols, the hash symbol, emoji, etc.). Additionally or alternatively, the block size can be based on the capabilities of the user, such that a user that can comprehend more characters in a single eye fixation can be presented with longer blocks of characters, and a user that can comprehend less characters in a single eye fixation can be presented with shorter blocks of characters.

In some embodiments, process 100 can group the text into blocks that are natural for a reader, by for example, not including the end of a sentence in the middle of a block (e.g., ending a block at the end of a sentence or paragraph), grouping the text such that blocks do not extend between lines, etc.

In some embodiments, process 100 can group text into blocks to be highlighted with guidance information such that the number of characters in the block are equal to or less than the set block size (e.g., 13 characters), or the set block size plus a limited number of characters (e.g., the set block size plus one character, plus two characters, etc.). If a block of text is larger than the set block size, the last word in the block can be moved to a next block of text in the text. Additionally, if the number of characters is greater than the block size by a predetermined amount (e.g., one character, two characters, etc.), and the last character(s) that are outside the block are punctuation (e.g., a period, a parentheses, a quotation mark, etc.), the last word and punctuation may not be excluded.

In some embodiments, process 100 can group text into blocks to be highlighted such that each block of text is on a single line (e.g., a block does not extend to multiple lines). When there are not enough words at the end of a line to make an efficient block (e.g., a block having a number of characters equal to 50%, 75%, 80%, etc. of the set block size), less words can be included in the block, rather than forming the block over two lines. Additionally, each line of text can be analyzed to determine the minimum number of blocks in the line that include blocks that are natural, and do not extend to another line.

In some embodiments, process 100 can group text into blocks to be highlighted such that each block of text includes a logical group of words and/or punctuation marks (or other text). For example, process 100 can set blocks in accordance with the following rules:

i. If there is a . that will be the end of block, the . can be used for that block.
    ii. If there is a , that will be the end of block, the , can be used for that block.
    iii. If there is a ! that will be the end of block, the ! can be used for that block.
    iv. If there is a ? that will be the end of block, the ? can be used for that block.
    v. If there is a : that will be the end of block, the : can be used for that block.
    vi. If there is a ; that will be the end of block, the ; can be used for that block.
    vii. If there is a " with a space before that would be the end of block, the " will not be used for that block.
    viii. If there is a " without a space before that will be the end of block, the " can be used for that block.

1. If one of the following characters is directly after it in the text (e.g., "."), such character can be used as the end of the block:
   a. .
   b. ,
   c. !
   d. ?
   e. ;
   f. :
ix. If there is a ( that will be the end of the block, the ( may not be used for that block.
x. If there is a ) that will be the end of the block, the ) can be used for that block.
   1. If one of the following characters is directly after it in the text, such character can be used as the end of the block:
      a. .
      b. ,
      c. !
      d. ?
      e. ;
      f. :
xi. If there is a < that will be the end of the block, the < may not be used for that block.
xii. If there is a > that will be the end of the block, the > can be used for that block.
   1. If one of the following characters is directly after it in the text, such character can be used as the end of the block:
      a. .
      b. ,
      c. !
      d. ?
      e. ;
      f. :
xiii. If there is a [ that will be the end of the block, the [ may not be used for that block.
xiv. If there is a] that will be the end of the block, the] can be used for that block.
   1. If one of the following characters is directly after it in the text, such character can be used as the end of the block:
      a. .
      b. ,
      c. !
      d. ?
      e. ;
      f. :
xv. If there is a { that will be the end of the block, the { may not be used for that block.
xvi. If there is a} that will be the end of the block, the} can be used for that block.
   1. If one of the following characters is directly after it in the text, such character can be used as the end of the block:
      a. .
      b. ,
      c. !
      d. ?
      e. ;
      f. :

In some embodiments, process 100, when providing guidance information to the reader, can highlight successive blocks for different periods of time based on the contents of the block, and can pause different amounts of time between highlighting successive blocks based on the formatting of the document. For example, process 100 can present guidance information for blocks that contain longer words for a longer period of time than for blocks that contain shorter words. In a more particular example, if a block of text includes a word longer than a predetermined number of characters (e.g., five characters, six characters, etc.), a few milliseconds (e.g., one millisecond, two milliseconds, three milliseconds, etc.) can be added for each character over the predetermined number of characters. As another example, if a punctuation mark immediately follows a word in a block of text, such as a period, a comma, an exclamation point, a question mark, a semi-colon, a colon, a parentheses, a quotation mark, etc., process 100 can increase the amount of time that the block is highlighted, and can include the punctuation mark in the block of text. As yet another example, process 100 can increase a time that a block of text at the end of a line is highlighted to give the user time to move to the beginning of the next line. As still another example, process 100 can increase a time that a block of text at the end of a line is highlighted when the next line is a blank line (e.g., between paragraphs) to give the user time to move to the next portion of text (e.g., the next paragraph). As a further example, process 100 can increase a time between highlighting successive blocks of text after a block of text at the end of a page is highlighted to give the user time to move to the top of the next page. As another further example, if process 100 receives an indication from the user to go to the next page, process 100 can increase a time between highlighting successive blocks of text. As yet another further example, if the text in a document, such as a Web page, goes off screen (e.g., the Web page needs to be scrolled, paged down, or the like), process 100 can increase a time between highlighting successive blocks of text after a block of text at the bottom of the currently viewable page is highlighted to give time for the page to be scrolled (or the like). In some embodiments, process 100 can cause the page to scroll automatically to a next portion of the page. As still another further example, if a block of text includes numbers (e.g., an equation or the like), the numbers can be presented as an entire block, and can be presented for longer than a block of text would be presented. As an additional example, process 100 can increase a time that a block of text that includes a word with one or more capital letters (e.g., proper nouns, important concepts, shouting, etc.), with emphasis (e.g., bolding, underlining, italicizing, etc.), with enumerations (e.g., an enumerated list) is highlighted. As another additional example, process 100 can pause after each image in a document for a predetermined amount of time. As yet another additional example, process 100 can pause after a zoom operation performed in response to a user input (e.g., a zoom-in or zoom-out).

In some embodiments, pauses can be provided during guidance at any point in the document where a reader may naturally pause while reading or where a reader may take longer to read a particular section of text due to a longer word, an equation, an image, a graph or figure, a sentence with a complex sentence structure, etc.

In some embodiments, upon selection of a document of which a portion has been previously read, process 100 can begin providing guidance information at the beginning of a line at which the user left off last time, or at the beginning of a sentence, beginning of a paragraph, etc.

In some embodiments, process 100 can provide additional guidance information to the reader. For example, FIG. 3F shows additional guidance information in a formatted document where one or more icons 310 can be presented on the left of certain words. In some embodiments, the presented text can be scanned and a word or a phrase with special meaning within the text can activate a corresponding icon. For example, an icon "☺" can be used as a goal signal that can be presented on the left of words "goal," "purpose," "objective," etc. As another example, an icon "©" can be used as a conclusion signal that can be presented on the left of words "consequently," "finally," "therefore," etc. As yet another example, icons "①," "②," "③," etc. can be used as sequence signals that can be presented on the left of words "first," "firstly," "second," "next," "then," "third," "later," "after," "for one thing," "another," "last," "until," etc. As still another example, an icon "!!" can be used as an emphasis signal that can be presented on the left of words "important," "significant," "especially," "key point," "remember that," "major development," "above all," "a primary concern," etc.

As another example, FIG. 3G shows additional guidance information in a formatted document where one or more keywords 312 of the text to be read by the user are shown on the left region of the text. In some embodiments, one or more keywords of a section of text can be determined by any suitable technique. For example, a bold word, an underlined word, and/or an italic word can be determined as a keyword. As another example, a word that appears in a section of text more than N (a predetermined number) times can be determined as a keyword. As yet another example, in connection with FIG. 1B, one or more keywords can be determined by process 1060.

Figure 3H:
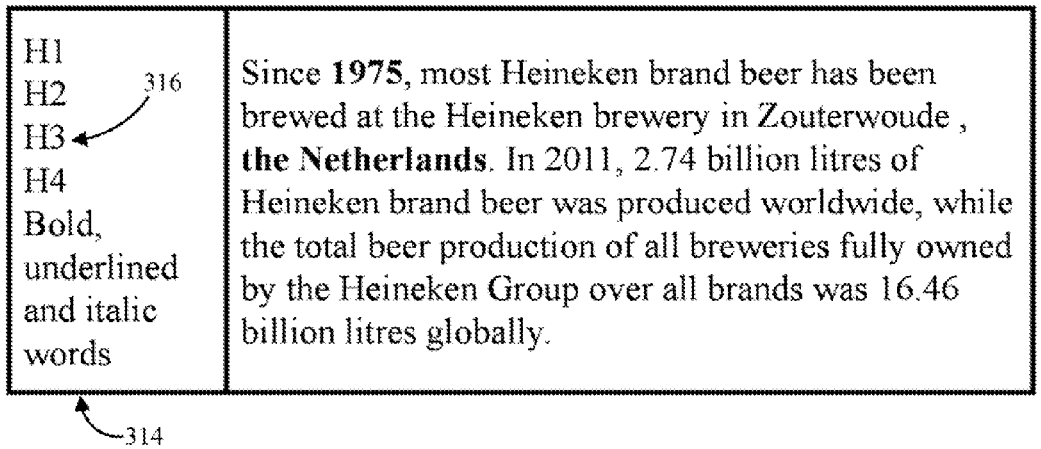

As yet another example, FIG. 3H shows additional guidance information in a formatted document where a helicopter view window 314 is shown beside of the text to be read by the user. In some embodiments, the helicopter view window 314 can present any suitable information that can help a user to get an overview of the document to be read by the user. For example, one or more hyperlinks 316 that lead the user to one or more specific pages of the document can be presented. As another example, an outline of the document can be presented in the helicopter view window 314.

Figure 3I:
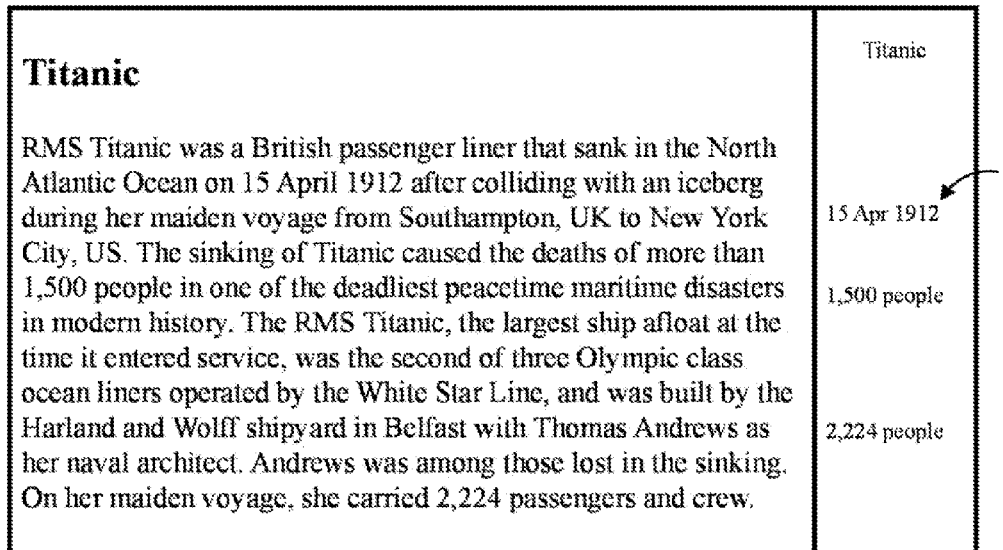

As still another example, FIG. 3I shows additional guidance information in a formatted document where a vertical toolbar 318 is shown beside of the text to be read by the user. In some embodiments, the vertical toolbar 318 can present brief information of the document to be read by the user, such as a structure of the document, one or more enumerations 317 of the document, page numbers that indicate where the headings and/or images are, etc.

It should be noted that, the guidance information shown in FIGS. 3A-3E and the additional guidance information shown in FIGS. 3F-3I can be controlled by the user. For example, process 100 can provide a user interface (such as a settings menu) to prompt the user to turn on or turn off one or more options that correspond to presenting one or more types of guidance information and/or additional guidance information.

Referring back to FIG. 1A, at 112, process 100 can determine if a user input has been received. User input can be received in any suitable form such as from a touchscreen of a computing device, from a pointing device coupled to a computing device, from a voice recognition circuit for recognizing voice commands, etc. Additionally, any suitable user input can be detected, for performing any suitable action within an application executing process 100. For example, a user input can be received to pause guidance, resume guidance, change a location of the guidance, change a placement within the text, browse for content, navigate to a home screen of an application executing process 100, navigate to or open a library of documents available for selection, change a set reading speed (e.g., by increasing or decreasing the set reading speed), change a page (e.g., by going to a next or previous page), scroll within a page (e.g., scrolling up, down, left or right in a page that is larger than the portion of a screen displaying the page), etc.

If an input from the user is not received ("NO" at 112), process 100 can return to 110 and continue presenting guidance to the user within the formatted document at the set reading speed. Otherwise, if process 100 determines that a user input is received ("YES" at 112), process 100 can proceed to 114.

At 114, process 100 can perform an action based on the user input received at 112. As described above, any suitable action can be performed in response to receiving an input at 112. For example, in some embodiments, if process 100 is being executed in an application of a computing device having a touchscreen (or a pointing device), a single tap detected by the touchscreen (or a single "click" from the pointing device) can cause guidance by process 100 to pause (or resume, if already paused). Additionally, when guidance is paused, a toolbar can be presented to the user with various user interface items for performing various actions. Such a toolbar can be hidden when guidance is resumed. As another example, a triple tap corresponding to a portion of the document can indicate a portion at which to begin providing guidance information. This can allow a user to switch a location at which they are reading.

In some embodiments, process 100 can receive an input that corresponds to a command to navigate to a next (or previous) page. For example, a swipe from right to left in the document can be received to indicate to go to the next page, and a swipe from left to right in the document can indicate to go to a previous page. As another example, a double tap on a right side of the document can indicate to go to the next page, and a double tap on the left side of the document can indicate to go to the previous page. Any other suitable inputs can correspond to a command to navigate to a next or previous page, and may be included in a toolbar of the application executing process 100. As described above, process 100 can automatically go to a next page when the guidance information reaches the end of the current page.

In some embodiments, process 100 can receive an input that corresponds to a command to increase (or decrease) the set reading speed at which guidance information is presented. For example, swiping down in the document can decrease the set reading speed, and swiping up in the document can increase the set reading speed. Additionally, in some embodiments, a length of the swipe can correspond to a size of the increase or decrease in the set reading speed. In some embodiments, the set reading speed can be altered in a settings portion of an application executing process 100.

After performing an action at 114, process 100 can return to 110 and continue presenting guidance information to the user within the formatted document at the set reading speed (which can be a newly set reading speed.

In some embodiments, an application executing process 100 can receive a user input to add user generated content such as notes, highlighting and/or other comments into the document, which can be saved in the document or in a separate file, such as a separate text file that corresponds to the selected document. In some embodiments, receiving a swipe gesture from left to right in the text (in cases where the application is running on a computing device having a touchscreen) can cause the portion of the text swiped over to be highlighted. In some cases, in order to highlight, the user may be required to hold a finger (or stylus, or other instrument, digit, etc., capable of activating a touchscreen) at the beginning of the portion to be highlighted, and then swipe to the end of the portion to be highlighted. In some embodiments, receiving a swipe gesture from right to left in the text (in cases where the application is running on a computing device having a touchscreen) at a highlighted portion can cause a highlight to be removed from a portion of the text corresponding to the swipe. A similar operation can be performed with a pointing device (e.g., by clicking and dragging). Additionally, a user input corresponding to a bookmarking action can be received which can cause a particular page or portion of the document to be bookmarked.

In some embodiments, user highlighted portions, comments, and/or user notes can automatically be saved in a separate document (e.g., in a document with file extension .doc, .docx, .txt, .html, etc.), which can be viewed separately from the document to which it corresponds. This can provide a summary of notes and/or highlights added to the document by the user.

In some embodiments, a user interface of an application that executes process 100 can present information to the user related to the user's current reading speed (e.g., in WPM) and an estimated time to complete reading the current document, a current section of the document, etc. (e.g., based on a number of words remaining and/or the formatting of the document, such as number of pages, etc.).

In some embodiments, process 100 can provide a search function for the library of documents, which can use keywords to find documents in the library of documents. Additionally, documents in the library can be organized for presentation to the user using any suitable format (e.g., a list, icons, tiles, cover art, etc.), and can be presented in any suitable order. For example, if a keyword search has been performed, only documents containing the keyword(s) may be presented, or all documents may be presented with emphasis on the documents containing the keyword(s). In a more particular example, documents can be presented based on the following order: (1) documents in which the keyword is in the title; (2) documents in which the keyword is in the body of the document; (3) the number of occurrences or prominence of the keyword in the title and/or body; (4) a document that was read more recently is ranked higher for order of presentation; (5) a document that is more recent in time is ranked higher for order of presentation (e.g., based on the publication date of the document, based on the date the document was added to the user's library, based on the date that the file was created, etc.), and/or any other suitable criteria. Note that the library can be sorted using any other suitable techniques, such as alphabetically by author, by title, by size, etc.

In some embodiments, process 100 can initiate various actions related to a document in response to a user input received at 112, such as saving the document to a particular location (e.g., to a memory of a device rather than to the library), sharing the document (e.g., using social media, email, text messages, cloud storage, etc.), printing the document using any suitable printer, etc.

In some embodiments, process 100 can provide a statistical function and/or an analytical function to show a reading behavior of a user. In some embodiments, the mechanisms described herein can record any suitable information in each step of process 100 and/or process 1060. For example, when a user is reading a document, the reading speeds at each section of the document can be recorded. In such an example, process 100 can provide statistical and/or analytical information that indicates the average reading speed, a reading speed versus time curve, and/or any other suitable information to the user. As another example, process 1060 can obtain information about subjects and/or keywords of documents that have been read by a user. In such an example, the mechanisms described herein can provide statistical and/or analytical information that indicates the favorite subjects that a user likes to read. As yet another example, the mechanisms described herein can provide statistical and/or analytical information that indicates how long a user reads per day/week/month/year, how many articles a user reads per day/week/month/year, etc. As still another example, the mechanisms described herein can provide analytical information regarding a particular document that indicates a position in the document at which the user stopped reading, one or more parts of the document that were skipped by the user, one or more sentences that were highlighted by the user, and/or any other suitable analytical information regarding the particular document.

In some embodiments, the statistical function and/or the analytical function can present the statistical and/or analytical information relating to a reading behavior of a user in any suitable manner. For example, the statistical and/or analytical information can be presented using heat maps, percentage figures, data tables, etc.

It should be noted that, prior to recording information related to a user, the mechanisms can provide the user with an opportunity to provide a consent or authorization to perform actions. Additionally or alternatively, in response to installing the application that executes process 100, the user can be prompted with a permission message that requires that the user provide consent prior to recording information relating to the user. In the instance where the user consents to the use of such data, information relating to reading behavior of a user can be recorded and/or be used.

In some embodiments, an application that executes process 100 can be configured to run on a computing device can have a home screen from which a user can cause the application to perform various actions, such as selecting a document (e.g., if the library is presented as part of the home screen), view scores of the user (e.g., average reading speed, reading speed over time, number of documents read, fastest reading speed, average length of documents, etc.). Additionally, the user can be presented with an option at the home screen (or in any other suitable user interface) to initiate eye training exercises for training the user's eyes to improve her reading. In some embodiments, a user interface item can be presented in the home screen for sharing the application (e.g., by sharing a link, etc.) using any suitable sharing technique(s) (e.g., social media, email, text message, etc.).

In some embodiments, a user's library of documents can be synchronized across multiple applications that use the mechanisms described herein (e.g., using the Internet, a local area network (LAN), etc.), and the user's place in the document can be saved with the library, such that the user can access any documents in the user's library, and can start reading a document on one device, and continue reading on a different device. Additionally, a document can be reformatted when opened on a different device such that an appropriate format is used to present the document to the user, based on the device being used to present the document (e.g., based on a screen size and/or resolution of the device, whether the device has a touch screen, etc.).

In some embodiments, the mechanisms described herein can include exercises for training and/or improving the user's eye movement to comply with the mechanisms described herein. FIG. 4A shows an example user interface for conducting an eye movement exercise where a user is instructed to follow the motion of an object 402 presented on the screen of the computing device executing the mechanisms described herein. For example, the object can move in any suitable direction (e.g., horizontally, vertically, diagonally, or a combination thereof), at any suitable speed, and can change size or shape, disappear and reappear, etc.

FIG. 4B shows an example of a user interface for conducting an eye movement exercise where a user is instructed to follow the motion of an animated dot 404 under text in a sample document. In some embodiments, the speed at which the dot moves can increase periodically (e.g., can increase every ten seconds).

Figure 4C:
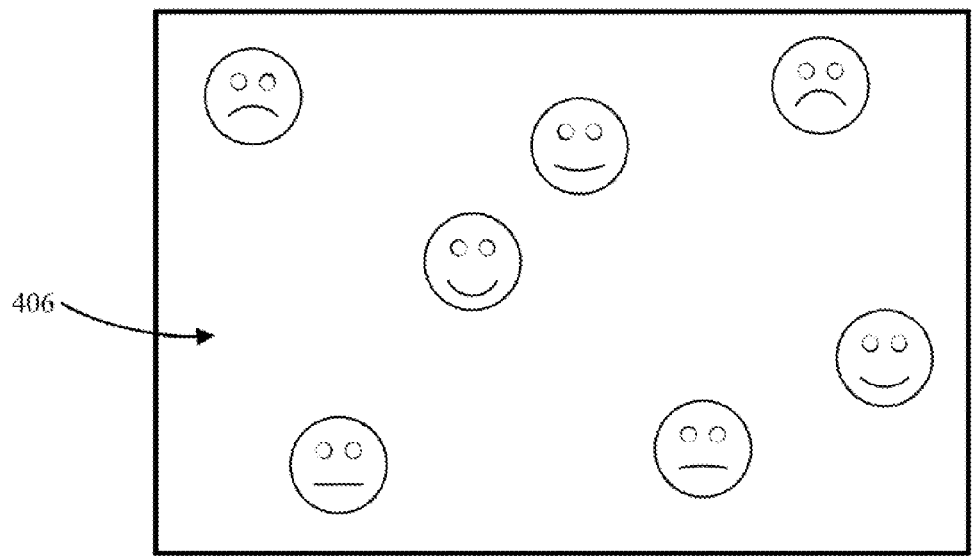

FIG. 4C shows an example of a user interface for conducting an eye movement exercise where a user is instructed to find different faces 406 as various faces move on the screen. In some embodiments, the user can select a face when she believes she found the correct face, and the movement speed of the faces can increase with each correct answer, and decrease with each wrong answer. Additionally, a similar exercise can be performed using words, numbers, or any other suitable object(s) rather than faces.

Figure 4D:
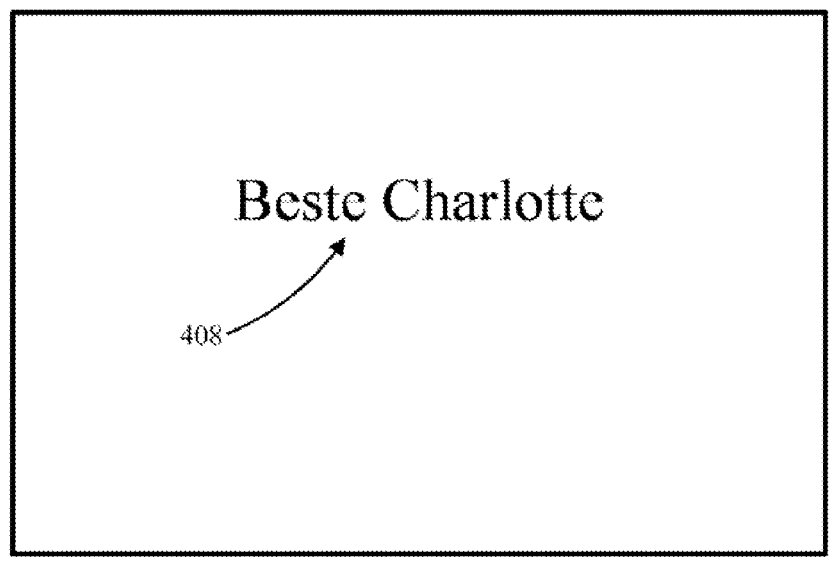

FIG. 4D shows an example of a user interface for conducting an eye movement exercise where a user is instructed to read text 408 as the text becomes wider (e.g., by increasing the space between characters, increasing the size of the text, etc.) and the user is tasked with reading the text. In some embodiments, the text may only be presented for a short amount of time. The user can be queried to identify the content of the text after the text is presented to the user. This can help the user increase the amount of characters that the user can comprehend in a given eye fixation, which can in turn increase reading speed and/or comprehension.

Figure 5:
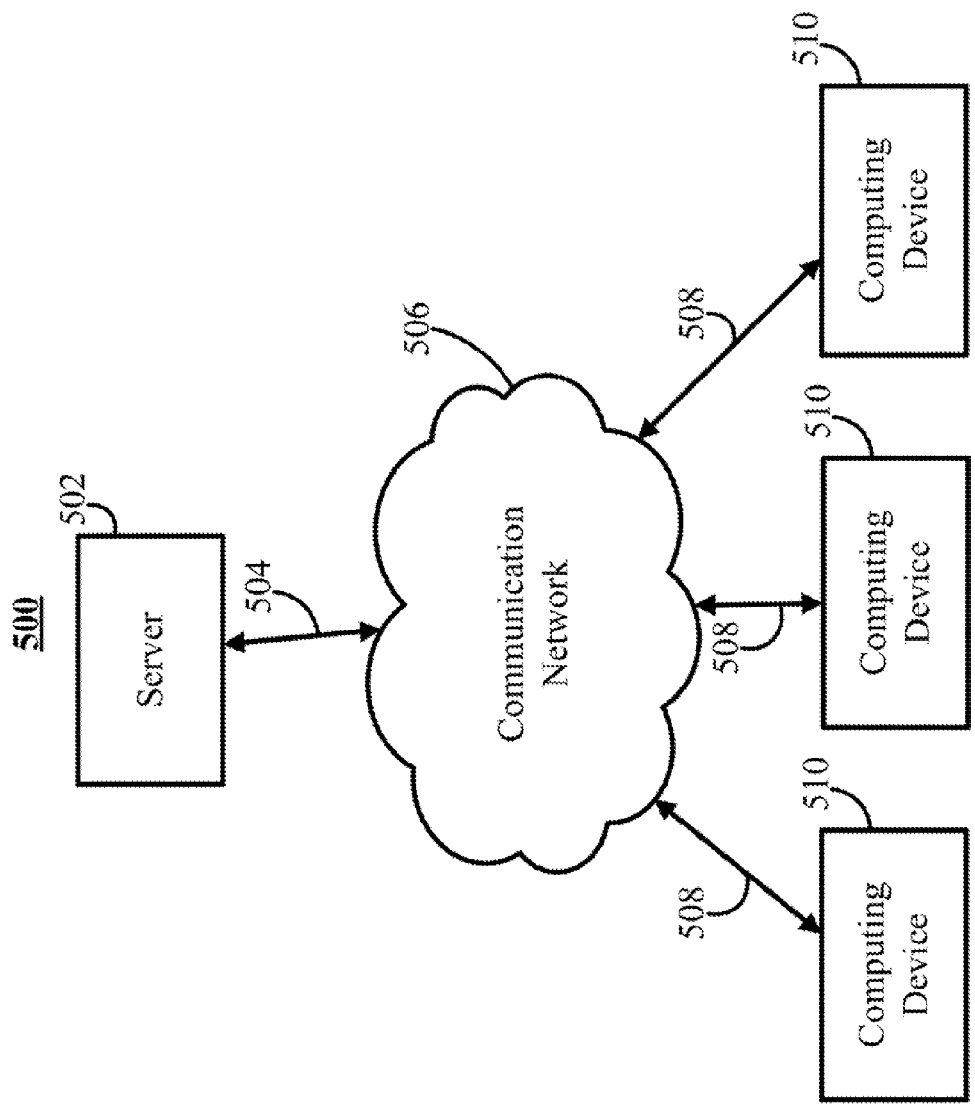
FIG. 5 is an example of a system for guiding user reading on a screen in accordance with some embodiments of the disclosed subject matter.

FIG. 5 shows an example 500 of a generalized schematic diagram of a system on which the mechanisms for providing content as described herein can be implemented in accordance with some implementations. As illustrated, system 500 can include one or more computing devices 510. Computing devices 510 can be local to each other or remote from each other. Computing devices 510 can be connected by one or more communications links 508 to a communications network 506 that can be linked via a communications link 504 to server 502.

System 500 can include one or more servers 502. Server 502 can be any suitable server for providing access to the mechanisms described herein or for providing copies of an application or a portion of an application (e.g., a computer program or portion of a computer program) for utilizing the mechanisms described herein for guiding user reading on a screen, such as a hardware processor, a computer, a data processing device, or any suitable combination of such devices. For example, the mechanisms for guiding user reading on a screen can be distributed into multiple backend components and multiple frontend components and/or interfaces. In a more particular example, backend components, such as data collection, data distribution, document synchronization, etc., can be performed on one or more servers 502. In another particular example, frontend components, such as a user interface, presentation of documents, presentation of guidance information, etc., can be performed on one or more computing devices 510.

In some implementations, each of the computing devices 510, and server 502 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, computing device 510 can be implemented as a personal computer, a laptop computer, a smartphone, a wearable computer, a tablet computer, a gaming device, a server, etc., or any suitable combination thereof.

Communications network 506 can be any suitable computer network or combination of such networks including the Internet, an intranet, a wide-area network (WAN), a local-area network (LAN), a wireless network, a digital subscriber line (DSL) network, a frame relay network, an asynchronous transfer mode (ATM) network, a virtual private network (VPN), etc. Communications links 504 and 508 can be any communications links suitable for communicating data among computing devices 510 and server 502, such as network links, dial-up links, wireless links, hard-wired links, any other suitable communications links, or any suitable combination of such links. Computing devices 510 and server 502 can be located at any suitable location.

Figure 6:
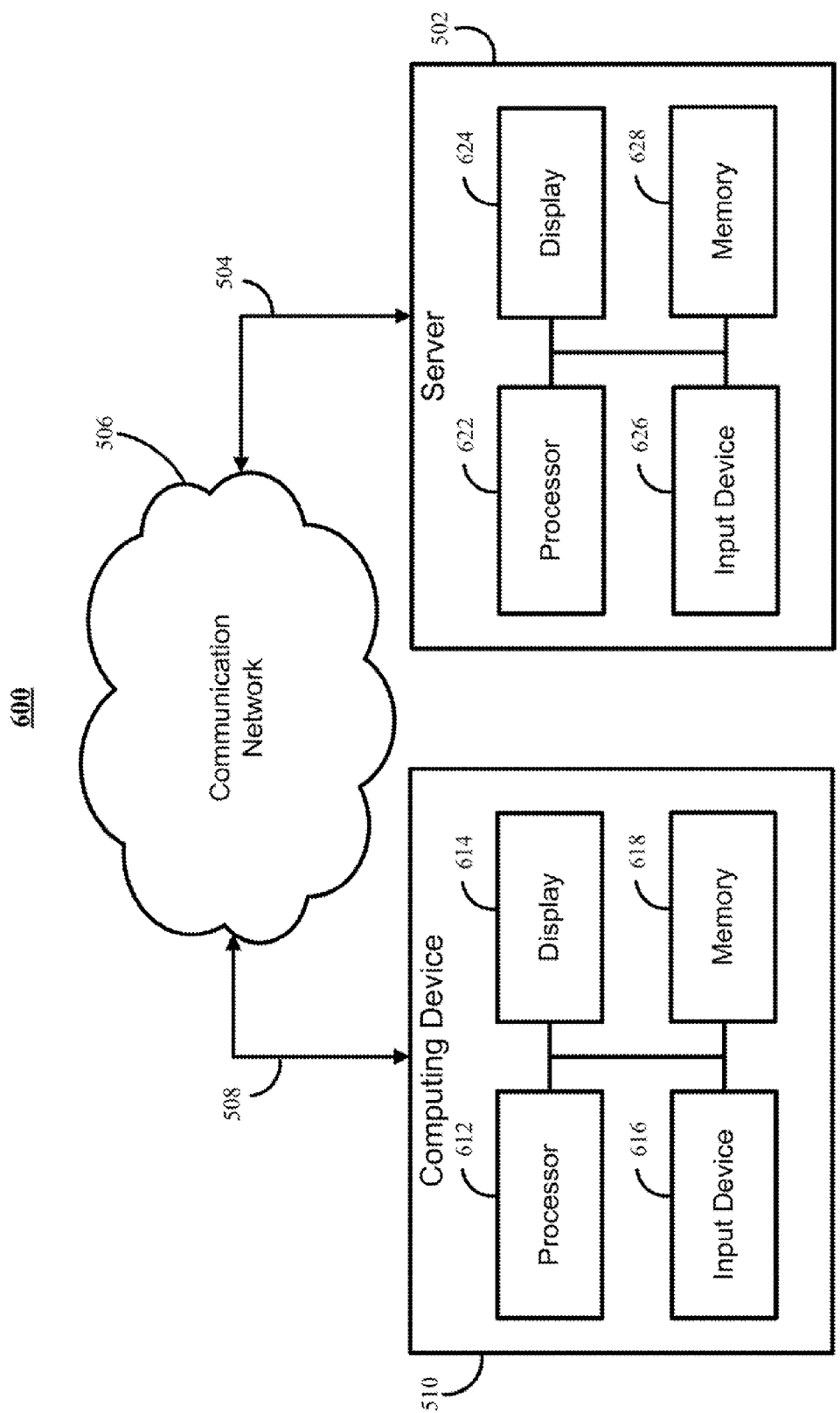
FIG. 6 is an example of hardware that can be used in a server and/or a computing device in accordance with some embodiments of the disclosed subject matter.

FIG. 6 illustrates an example 600 of hardware that can be used to implement server 502 and one of the computing devices 510 depicted in FIG. 5 in accordance with some implementations of the disclosed subject matter. Referring to FIG. 6, computing device 510 can include a hardware processor 612, a display 614, an input device 616, and memory 618, which can be interconnected. In some implementations, memory 618 can include a storage device (such as a non-transitory computer-readable medium) for storing a computer program for controlling hardware processor 612.

Hardware processor 612 can use the computer program to present on display 614 documents and/or an interface that allows a user to, among other things, interact with and/or use the mechanisms described herein for providing guiding user reading on a screen, and to send and receive data through communications link 508. Display 614 can be a flat panel display (e.g., an LED display, an OLED display, a plasma display, etc.), a cathode ray tube display, a projector, a touchscreen, a speaker(s), and/or any other suitable display and/or presentation devices. Input device 616 can be a computer keyboard, a computer mouse, a microphone, a touchpad, a voice recognition circuit, a touchscreen, and/or any other suitable input device.

Server 502 can include a hardware processor 622, a display 624, an input device 626, and memory 628, which can be interconnected. In some implementations, memory 628 can include a storage device for storing data received through communications link 504 or through other links. The storage device can further include a server program for controlling hardware processor 622.

Hardware processor 622 can use the server program to communicate with computing devices 510, as well as provide access to and/or copies of the mechanisms described herein. Display 624 can be a flat panel display, a cathode ray tube display, a projector, a touch screen, a speaker(s), and/or any other suitable display and/or presentation devices. Input device 626 can be a computer keyboard, a computer mouse, a touchpad, a voice recognition circuit, a touchscreen, and/or any other suitable input device.

In some implementations, the mechanisms described herein can include server-side software, client-side software, server-side hardware, client-side hardware, firmware, or any suitable combination thereof. For example, these mechanisms can encompass one or more Web pages or Web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches). As another example, these mechanisms can encompass a computer program that causes a processor to execute the user input interface application. For instance, these mechanisms can encompass a computer program written in a programming language recognizable by computing device 510 and/or server 502 that is executing the mechanisms (e.g., a program written in a programming language, such as, Java, C, Objective-C, C++, C#, JavaScript, Visual Basic, HTML, XML, Cold Fusion, any other suitable approaches, or any suitable combination thereof).

In some implementations, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the processes of FIGS. 1A and 1B can be executed or performed in any order or sequence not limited to the order and sequence shown and described in the figures. Also, some of the above steps of the processes of FIGS. 1A and 1B can be executed or performed substantially simultaneously where appropriate or in parallel to reduce latency and processing times. Furthermore, it should be noted that FIGS. 1A and 1B are provided as examples only. At least some of the steps shown in these figures may be performed in a different order than represented, performed concurrently, or omitted.

It should also be noted that, as used herein, the term mechanism can encompass hardware, software, firmware, or any suitable combination thereof. The provision of the examples described herein (as well as clauses phrased as "such as," "e.g.," "including," and the like) should not be interpreted as limiting the claimed subject matter to the specific examples; rather, the examples are intended to illustrate only some of many possible aspects. It should also be noted that, as used herein, the term mechanism can encompass hardware, software, firmware, or any suitable combination thereof.

Accordingly, methods, systems, and media for guiding user reading on a screen are provided.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A method for guiding user reading on a screen, the method comprising:
    determining a reading speed of a user using a hardware processor;
    receiving a selection of a document having text;
    setting a presenting speed for the document based at least in part on the determined reading speed of the user;
    determining an amount of characters that a reader can read during a single eye fixation;
    determining a plurality of blocks of text in the document that each have no incomplete words, and that each include no more than the determined amount of characters that the reader can read during a single eye fixation;
    formatting the text of the document, such that each of the blocks is on a single line in the text of the document; and
    presenting guidance to the user within the formatted document, wherein the guidance is moving along the text of the formatted document from one of the blocks to its successive block based on the set presenting speed.

2. The method of claim 1, further comprising changing a location of the guidance information within the original document in response to receiving a user input.

3. The method of claim 1, wherein the original layout includes at least one of: paragraphs; images; graphics; and hyperlinks.

4. The method of claim 3, wherein formatting further comprises at least one of:
    setting a font of the document to a particular font;
    setting a font size of the document to a particular font size;
    setting a line spacing of the document to a particular line spacing;
    setting a text color of the document to a particular color; and
    setting a background color of the document to a particular background color.

5. The method of claim 1, further comprising adding user generated content to the document in response to user inputs to add user generated content.

6. The method of claim 5, further comprising creating a summary of the text based on the added user generated content.

7. A system for guiding user reading on a screen, the system comprising:
    a hardware processor that is programmed to:
        determine a reading speed of a user;
        receive a selection of a document having text;
        set a presenting speed for the document based at least in part on the determined reading speed of the user;
        determine an amount of characters that a reader can read during a single eye fixation;
        determine a plurality of blocks of text in the document that each have no incomplete words, and that each include no more than the determined amount of characters that the reader can read during a single eye fixation;
        format the text of the document, such that each of the blocks is on a single line in the text of the document; and
        present guidance to the user within the formatted document, wherein the guidance is moving along the text of the formatted document from one of the blocks to its successive block at the set presenting speed.

8. The system of claim 7, wherein the hardware processor is further programmed to change a location of the guidance information within the original document in response to receiving a user input.

9. The system of claim 7, wherein the original layout includes at least one of: paragraphs; images; graphics; and hyperlinks.

10. The system of claim 9, wherein the hardware processor is further programmed to do at least one of the following when formatting the selected document:
    set a font of the document to a particular font;
    set a font size of the document to a particular font size;

set a line spacing of the document to a particular line spacing;
set a text color of the document to a particular color; and
set a background color of the document to a particular background color.

11. The system of claim 7, wherein the hardware processor is further programmed to add user generated content to the document in response to user inputs to add user generated content.

12. The system of claim 11, wherein the hardware processor is further programmed to create a summary of the text based on the added user generated content.

13. A non-transitory computer-readable medium containing computer-executable instructions that, when executed by a processor, cause the processor to perform a method for guiding user reading on a screen, the method comprising:
determining a reading speed of a user using a hardware processor;
receiving a selection of a document having an original layout to be read;
setting a presenting speed for the document based at least in part on the determined reading speed of the user;
determining an amount of characters that a reader can read during a single eye fixation;
dividing text in the formatted document into blocks that include a plurality of words;
formatting the text of the document, such that each of the blocks is on a single line in the text of the document; and
presenting guidance to the user within the formatted document, wherein the guidance is moving along the text of the formatted document from one of the blocks to its successive block at the set presenting speed.

14. The non-transitory computer-readable medium of claim 13, wherein the method further comprises changing a location of the guidance information within the original document in response to receiving a user input.

15. The non-transitory computer-readable medium of claim 13, wherein the original layout includes at least one of: paragraphs; images; graphics; and hyperlinks.

16. The non-transitory computer-readable medium of claim 15, wherein formatting further comprises at least one of:
setting a font of the document to a particular font;
setting a font size of the document to a particular font size;
setting a line spacing of the document to a particular line spacing;
setting a text color of the document to a particular color; and
setting a background color of the document to a particular background color.

17. The non-transitory computer-readable medium of claim 13, wherein the method further comprises adding user generated content to the document in response to user inputs to add user generated content.

18. The non-transitory computer-readable medium of claim 17, wherein the method further comprises creating a summary of the text based on the added user generated content.

19. The method of claim 1, further comprising:
determining a complexity of a sentence; and
adjusting the presenting speed based on the determined complexity.

20. The system of claim 7, wherein the hardware processor is further programmed to:
determine a complexity of a sentence; and
adjust the presenting speed based on the determined complexity.

* * * * *